Figure 1:
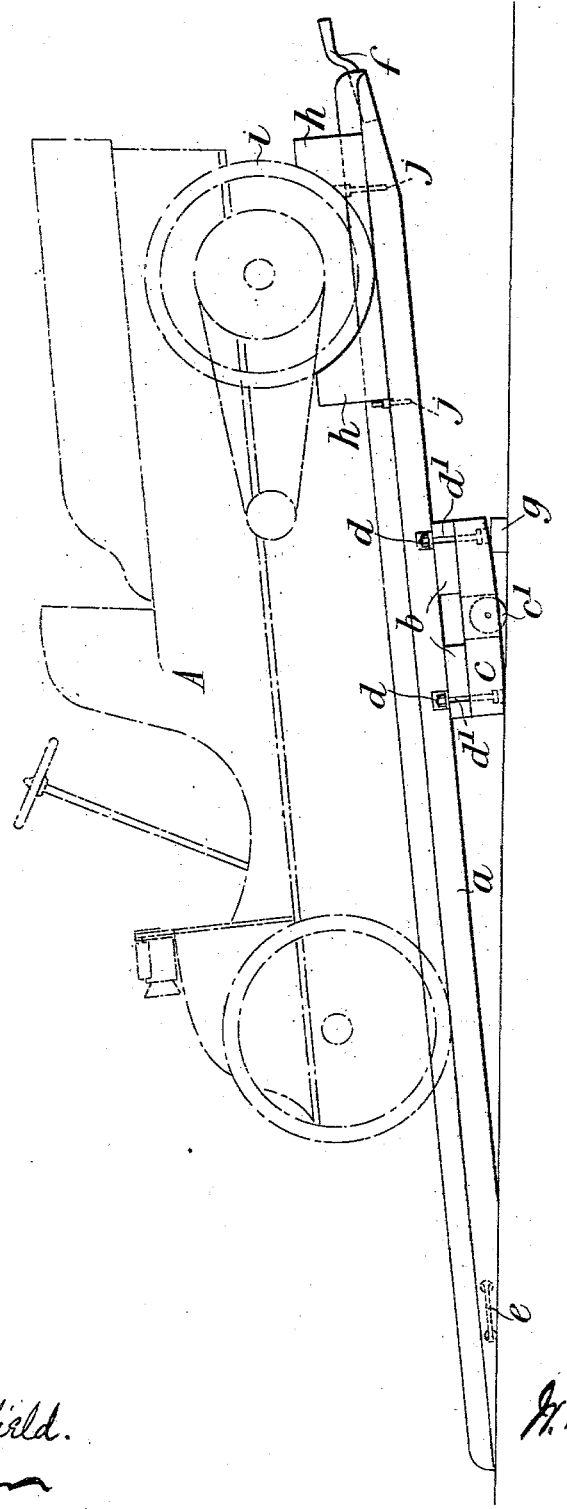

No. 745,545. PATENTED DEC. 1, 1903.
W. R. WEBB.
APPARATUS FOR RAISING VEHICLES FOR INSPECTION AND REPAIR.
APPLICATION FILED AUG. 29, 1903.
NO MODEL. 2 SHEETS—SHEET 1.

Witnesses
John E. Bousfield.
C. G. Redfern

Inventor.
W. R. Webb.

No. 745,545. PATENTED DEC. 1, 1903.
W. R. WEBB.
APPARATUS FOR RAISING VEHICLES FOR INSPECTION AND REPAIR.
APPLICATION FILED AUG. 29, 1903.
NO MODEL. 2 SHEETS—SHEET 2.
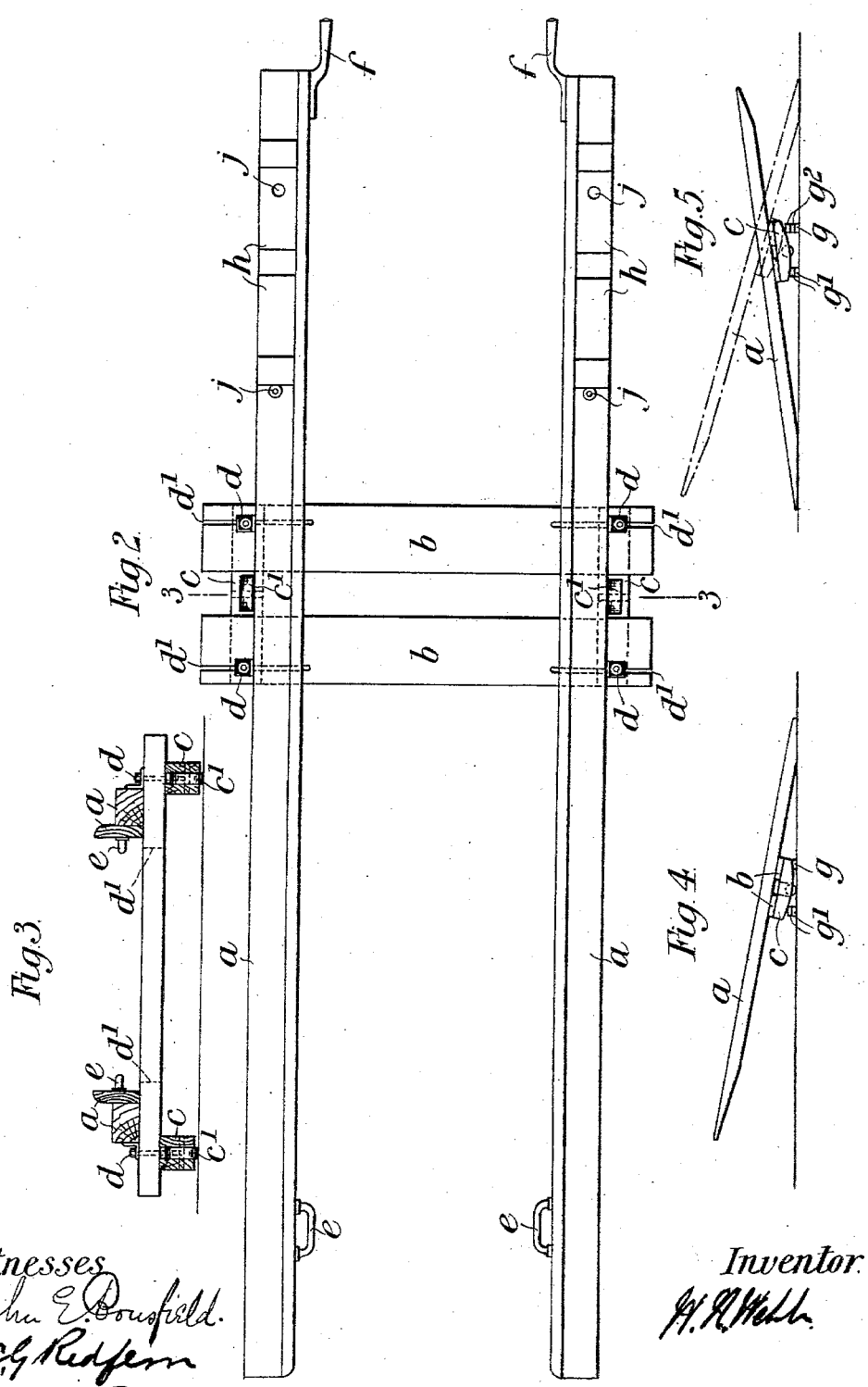

No. 745,545. Patented December 1, 1903.

UNITED STATES PATENT OFFICE.

WILLIAM ROBERT WEBB, OF LONDON, ENGLAND.

APPARATUS FOR RAISING VEHICLES FOR INSPECTION AND REPAIR.

SPECIFICATION forming part of Letters Patent No. 745,545, dated December 1, 1903.

Application filed August 29, 1903. Serial No. 171,236. (No model.)

*To all whom it may concern:*

Be it known that I, WILLIAM ROBERT WEBB, a subject of the King of Great Britain, residing at 12 Shaftesbury road, Hornsey Rise, London, England, have invented a new and useful Apparatus for Raising Carriages and Motor Road-Vehicles for Inspection and Repair, of which the following is a specification.

This invention relates to apparatus whereby carriages and motor road-vehicles can be raised to facilitate their examination from beneath.

According to the invention I provide a cradle or frame which is mounted upon a pair of rockers, so that it can be tilted to enable the carriage or motor-vehicle to be run onto it and held in place thereon. Blocks are then placed underneath the raised ends of the rockers, and the cradle is tilted upon these blocks to enable blocks to be placed under the other ends of the rockers, and so on, the blocks being placed alternately under either end of the rockers until the cradle, and consequently the vehicle, is raised to the requisite height above the ground.

To enable the invention to be fully understood, I will describe it by reference to the accompanying drawings, in which—

Figure 1 is a side elevation of the cradle, showing a motor-car in position thereon. Fig. 2 is a plan view of the apparatus. Fig. 3 is a section on the line 3 3, Fig. 2; and Figs. 4 and 5 are two views drawn to a smaller scale to illustrate the manner in which the cradle is raised by means of the blocks.

The cradle shown in the drawings is composed of a pair of longitudinal rails $a\ a$, which are secured to the cross-pieces $b\ b$, mounted upon the lateral rockers $c\ c$, each of which is provided with a roller $c'$ to facilitate the manipulation of the apparatus. The rails $a$, transverse pieces $b$, and rockers $c$ are secured together by means of the bolts $d\ d$, which pass through slots $d'\ d'$ in the cross-pieces $b\ b$, so that the distance between the rails $a\ a$ can be arranged to suit the gage of the wheels of the carriage or other vehicle to be placed upon the cradle.

The ends of the rails $a\ a$ are beveled, as shown, to enable the said rails to be tilted upon the rockers to a greater extent than would otherwise be the case and to give an extended bearing-surface upon the ground.

Handles $e\ e$ and $f\ f$ are provided at the two ends of the rails $a\ a$ for operating the cradle.

To make use of the apparatus the cradle is tilted into the position shown in Fig. 1, a block $g$ is placed under each of the rockers $c$, and the carriage or other vehicle A is then run onto the cradle, as shown, being retained in position by means of the blocks $h\ h$, which are placed upon either side of each of the back wheels $i$ of the vehicle and are held in position by the bolts or pins $j\ j$. The cradle is then tilted up in the other direction upon the blocks $g\ g$ as a fulcrum until sufficient space is obtained underneath the other ends of the rockers to permit of the insertion of the blocks $g'$ at these ends, as clearly shown in Fig. 4. The cradle is then again tilted in the other direction and further blocks $g^2$ are placed upon the first blocks $g\ g$, (see Fig. 5,) and so on until the cradle has been raised to the requisite height. By the use of the rollers $c'\ c'$ the cradle, with the carriage upon it, can be easily turned or transported, if required, prior to the tilting operation.

Having now particularly described and ascertained the nature of my said invention and in what manner the same is to be performed, I declare that what I claim is—

1. Apparatus for raising carriages and motor road-vehicles comprising a cradle or frame mounted upon rockers so that it can be tilted, and blocks adapted to be placed alternately under the opposite ends of the rockers, substantially as hereinbefore described.

2. Apparatus for raising carriages and motor road-vehicles comprising a pair of rails upon which the carriage or other vehicle is run, means for adjusting the gage of the rails, means for securing the carriage on the rails, rockers which are secured to the rails and upon which they can be rocked by means of handles, and blocks adapted to be inserted alternately under the opposite ends of the rockers, substantially as hereinbefore described.

3. In apparatus of the kind described the combination with the rockers of rollers, substantially as, and for the purpose, described.

WILLIAM ROBERT WEBB.

Witnesses:
JOHN E. BOUSFIELD,
C. G. REDFERN.